F. J. SEYBOLD.
Car-Couplings.
No. 141,895.          Patented August 19, 1873.
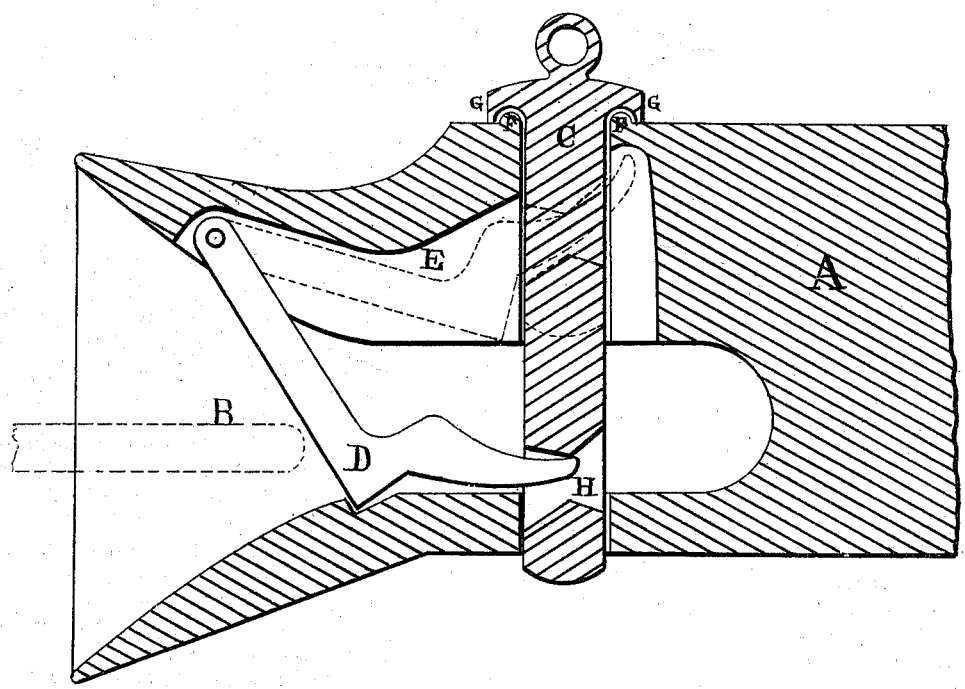
Witnesses
Lizzie Paine.
James E. Munroe.
Inventor.
Frederick J. Seybold

UNITED STATES PATENT OFFICE.

FREDERICK J. SEYBOLD, OF CHICAGO, ILLINOIS.

IMPROVEMENT IN CAR-COUPLINGS.

Specification forming part of Letters Patent No. 141,895, dated August 19, 1873; application filed January 9, 1873.

*To all whom it may concern:*

Be it known that I, FREDERICK J. SEYBOLD, of the city of Chicago, county of Cook and State of Illinois, have invented a new and useful Improvement in Car-Couplers; and I do hereby declare the following to be a full, clear, and exact description thereof, which will enable others skilled in the art to which my invention appertains to make and use the same, reference being had to the accompanying drawings, forming part of this specification.

In the drawing, letter A is the draw-bar or bumper of a car. Letter B is the opening in the same, into which the link passes. C is the pin that passes through the link, and holds the link from coming out. D is a lever, whose upper end works on a pivot in the bumper above the opening B, and whose lower end rests on the bumper at the bottom of the opening B, and in front of the pin C. H is a slot in the pin, through which the lower end of the lever D passes, as it (the lower end of the lever D) is raised up by the link striking it in front. E is a recess, into which the lever D passes out of the way of the link, as it (the lever D) is raised up. F is a ring, raised above the bumper around the edge of the hole, through which the pin passes. G is a shoulder on the pin, to prevent the pin from passing through the hole in the bumper. The under edge of this shoulder G is grooved out all around, so as to fit down over the ring around the top of the hole, thus preventing water from blowing into the hole.

The operation of this coupler is as follows: The link striking the lever D from the front, the lower end of the lever D is raised, and passing through the slot H in the pin C, the pin C is raised, and the link passes in under the pin, when the pin drops down through the link, and the car is coupled. The car is uncoupled by simply lifting up the pin, as in the ordinary manner.

Having thus described my invention, what I claim as new and as my invention, and desire to secure by Letters Patent, is—

The combination, in a draw-head, A, of an angular lever, D, with a pin, C, having an angular slot, H, substantially as described, and for the purpose set forth.

F. J. SEYBOLD.

Witnesses:
 JAMES E. MUNROE,
 JOHN S. STEVENS.